Patented Sept. 21, 1937

2,093,504

UNITED STATES PATENT OFFICE 2,093,504

MANUFACTURE OF SULPHIDES

Hans Zirngibl, Bitterfeld, Germany, assignor to I. G. Farbenindustrie Aktiengesellschaft, Frankfort-on-the-Main, Germany No Drawing. Application September 17, 1935, Serial No. 40,916. In Germany September 20, 1934

5 Claims. (Cl. 23—137)

The present invention relates to an improvement in the manufacture of sulphides by reduction of the corresponding sulphates with hydrogen or other reducing gases and more particularly to new catalysts for performing the reduction process.

In the manufacture of sulphides by treating sulphates with reducing gases catalysts, for instance iron or copper, have been used with effect. It is particularly advantageous that the reduction should occur in the solid phase from beginning to end. In consequence of the low melting point of some sulphates or products of reaction sintering and the like is apt to occur and to give rise to phenomena of fusion and agglomeration. Thus in the case of the reduction of sodium sulphate by means of hydrogen already at about 630° C., and therefore far below the melting point of the sulphate, the effects of agglomeration obtained by pressure or high heaping are aggravated, and the free operation of the shaft furnace or rotary furnace becomes in danger.

This invention is based on the observation that the operation may be conducted at a reduced temperature, so that the said difficulties are avoided, by substituting for the said catalysts others which consist of iron compounds or iron-copper compounds and a compound of one of the following weakly basic metals: lead, titanium, arsenic, antimony, bismuth, molybdenum, tungsten, uranium. A similar improvement, although not so good, of the iron catalyst or iron-copper catalyst is obtained by activating the catalyst with a compound of thorium, cerium, tin, vanadium, tantalium or niobium.

The added catalyst activates the iron or iron-copper catalyst and at the same time stabilizes it. The necessary proportion of catalyst may be kept, in general, within very small limits, about 1 per cent. to 0.1 per cent. and lower, so that the sulphide produced has a lighter color than that produced with the aid of the catalysts hitherto used. The use of these new catalysts has also the advantage that, for example, the height of heaping of the mass during the reduction can be increased without fear of causing conglomeration. Also the time of reaction may be shortened, and a higher throughput obtained. For carrying out the reduction an oxidizing pre-heating of the moulded pieces is to be recommended.

Advantageously, the auxiliary catalyst is used in the form of its oxide or sulphur compound or in the form of a compound which during the treatment or during the reduction is converted into such oxide or sulphide.

The following examples illustrate the invention:—

*Example 1.*—1000 kilos of sodium sulphate, which in the course of its manufacture has acquired a content of 0.2 per cent. of iron, are intimately mixed with 1.5 kilos of antimony pentoxide and the mixture is moistened with a very dilute solution of potassium pyroantimoniate. The mixture is made into briquettes and the latter are dried and heated under oxidizing conditions in a preliminary furnace. In this manner water and excess of sulphuric acid are expelled and the catalyst is activated and stabilized. The briquettes are then reduced by means of hydrogen at 600–605° C. After 3–4 hours of this operation the briquettes are found to be reduced to the extent of 95 to 99 per cent.

If, for the sake of comparison, instead of granules made with mixed catalysts, there are used only such as contain iron or iron and copper, it is necessary to extend the reduction period to double or three times the period stated above and also to use a temperature of at least 630 to 650° C. At these temperatures and periods, however, damaging agglomerations are easily formed.

*Example 2.*—1000 kilos of a sodium sulphate containing traces of iron acquired during its manufacture are sprayed with a solution of 3.88 kilos of crystallized copper nitrate and 1.66 kilos of titanium sulphate. Briquettes made from this mixture are easily reducible and yield a highly valuable sodium sulphide.

*Example 3.*—Similarly, very favorable results are obtained by mixing 1000 kilos of sulphate, having a content of 0.2 per cent. of iron, with 0.6 kilo of arsenic trioxide and 0.6 kilo of antimony pentoxide and moulding the mixture into briquettes.

*Example 4.*—1000 kilos of sodium sulphate, which contains 0.2 per cent. of iron as a manufacturing impurity, are intimately mixed with 2 kilos of red lead. The mixture is moistened in known manner and briquetted. The briquettes are heated and then reduced with hydrogen at 600 to 605° C. At the end of 2 hours the briquettes have been reduced to the extent of 95 to 99 per cent.

The mixed catalyst may be used also in the reduction of the alkaline earth sulphates which melt at high temperatures.

It will be seen from the foregoing statements that a large series of mixed catalysts is available for the purpose in question. Thus there is the possibility of suiting the catalyst to the specific nature of the parent sulphate (content of acid, content of salt and porosity of the briquettes). The best conditions may be ascertained by trial.

What I claim is:—

1. In the process of manufacturing alkali metal sulphides by reduction of the corresponding sulphates in the solid phase with a reducing gas and in the presence of a catalyst of the group consisting of iron and iron-copper catalysts, the step which comprises adding as a further activator a compound of a heavier metal, the oxides of which show an amphoteric behavior, of the group consisting of lead, titanium, arsenic, antimony, bismuth, molybdenum, tungsten, uranium.

2. In the process of manufacturing alkali metal sulphides by reduction of the corresponding sulphates in the solid phase with a reducing gas and in the presence of a catalyst of the group consisting of iron and iron-copper catalysts, the step which comprises adding as a further component a weakly basic oxygen compound of antimony.

3. In the process of manufacturing alkali metal sulphides by reduction of the corresponding sulphates in the solid phase with a reducing gas and in the presence of a catalyst of the group consisting of iron and iron-copper catalysts, the step which comprises adding as a further component an oxygen compound of arsenic.

4. In the process of manufacturing alkali metal sulphides by reduction of the corresponding sulphates in the solid phase with a reducing gas and in the presence of a catalyst of the group consisting of iron and iron-copper catalysts, the step which comprises adding as a further component a weakly alkaline oxygen compound of lead.

5. In the process of manufacturing alkali metal sulphides by reduction of the corresponding sulphates in the solid phase with a reducing gas and in the presence of a catalyst of the group consisting of iron and iron-copper catalysts, the step which comprises adding as a further component red lead.

HANS ZIRNGIBL.